(12) United States Patent
Kirby

(10) Patent No.: US 8,121,845 B2
(45) Date of Patent: Feb. 21, 2012

(54) SPEECH SCREENING

(75) Inventor: James M Kirby, Malvern (GB)

(73) Assignee: Aurix Limited, Malvern, Worcestershire (GB)

( * ) Notice: Subject to any disclaimer, the term of this patent is extended or adjusted under 35 U.S.C. 154(b) by 947 days.

(21) Appl. No.: 12/153,363

(22) Filed: May 16, 2008

(65) Prior Publication Data

US 2008/0294439 A1    Nov. 27, 2008

Related U.S. Application Data

(60) Provisional application No. 60/924,564, filed on May 21, 2007.

(30) Foreign Application Priority Data

May 18, 2007  (GB) .................................. 0709574.8

(51) Int. Cl.
*G10L 15/22* (2006.01)
*G10L 21/00* (2006.01)

(52) U.S. Cl. ......... 704/273; 704/254; 704/275; 704/251

(58) Field of Classification Search ........................ None
See application file for complete search history.

(56) References Cited

U.S. PATENT DOCUMENTS

| | | | |
|---|---|---|---|
| 5,706,507 A | 1/1998 | Schloss | |
| 5,835,722 A * | 11/1998 | Bradshaw et al. | 709/225 |
| 5,878,233 A * | 3/1999 | Schloss | 709/225 |
| 5,911,043 A * | 6/1999 | Duffy et al. | 709/203 |
| 5,996,011 A * | 11/1999 | Humes | 709/225 |
| 6,065,056 A * | 5/2000 | Bradshaw et al. | 709/229 |
| 6,266,664 B1 * | 7/2001 | Russell-Falla et al. | 707/700 |
| 6,295,559 B1 * | 9/2001 | Emens et al. | 709/225 |
| 6,317,795 B1 * | 11/2001 | Malkin et al. | 709/246 |
| 6,336,117 B1 * | 1/2002 | Massarani | 707/711 |
| 6,493,744 B1 * | 12/2002 | Emens et al. | 709/203 |
| 6,510,458 B1 * | 1/2003 | Berstis et al. | 709/219 |
| 6,539,430 B1 * | 3/2003 | Humes | 709/225 |
| 6,606,659 B1 * | 8/2003 | Hegli et al. | 709/225 |
| 6,633,855 B1 * | 10/2003 | Auvenshine | 706/15 |

(Continued)

FOREIGN PATENT DOCUMENTS

EP          1 510 945          3/2005

(Continued)

OTHER PUBLICATIONS

UK Intellectual Property Office Examination Report dated Nov. 2, 2009 in corresponding UK Application 0808957.5.

(Continued)

*Primary Examiner* — Talivaldis Ivars Smits

(74) *Attorney, Agent, or Firm* — Nixon & Vanderhye P.C.

(57) ABSTRACT

This invention relates to screening of spoken audio data so as to detect threat words or phrases. The method is particularly useful for protecting children or vulnerable adults from unsuitable content and/or suspicious or threatening contact with others via a communication medium. The method is applicable to screening speech transmitted over a computer network such as the internet and provides screening of access to stored content, e.g. audio or multimedia data files, as well as real time speech such as live broadcasts or communication via voice over IP or similar communication protocols. The method allows an administrator, e.g. a parent, to identify groups of threat words or phrases to be monitored, to set user access levels and to determine appropriate responses when threat words or phrases are detected.

28 Claims, 1 Drawing Sheet

U.S. PATENT DOCUMENTS

| | | | |
|---|---|---|---|
| 6,675,161 B1 * | 1/2004 | Suchter | 1/1 |
| 6,725,380 B1 * | 4/2004 | Forlenza et al. | 726/6 |
| 6,782,510 B1 * | 8/2004 | Gross et al. | 715/257 |
| 6,829,582 B1 * | 12/2004 | Barsness | 704/275 |
| 6,928,455 B2 * | 8/2005 | Dougu et al. | 1/1 |
| 6,947,985 B2 * | 9/2005 | Hegli et al. | 709/224 |
| 6,978,266 B2 * | 12/2005 | Larason et al. | 1/1 |
| 7,039,700 B2 * | 5/2006 | Saeidi | 709/224 |
| 7,093,287 B1 * | 8/2006 | Gusler et al. | 726/13 |
| 7,130,850 B2 * | 10/2006 | Russell-Falla et al. | 1/1 |
| 7,219,150 B2 * | 5/2007 | Saeidi | 709/224 |
| 7,305,624 B1 * | 12/2007 | Siegel | 715/738 |
| 7,334,037 B2 * | 2/2008 | Woods et al. | 709/225 |
| 7,359,899 B2 * | 4/2008 | Larason et al. | 1/1 |
| 7,421,498 B2 * | 9/2008 | Packer | 709/225 |
| 7,428,585 B1 * | 9/2008 | Owens et al. | 709/223 |
| 7,444,403 B1 * | 10/2008 | Packer et al. | 709/224 |
| 7,444,518 B1 * | 10/2008 | Dharmarajan et al. | 713/185 |
| 7,689,913 B2 * | 3/2010 | Umbreit | 715/271 |
| 2006/0095262 A1 | 5/2006 | Danieli | |

FOREIGN PATENT DOCUMENTS

| | | |
|---|---|---|
| GB | 2 449 742 | 8/2010 |
| WO | WO 97/40446 | 10/1997 |

OTHER PUBLICATIONS

United Kingdom Search Report for Great Britain Application No. 0709574.8, dated Aug. 30, 2007.

Search and Examination Report mailed Sep. 24, 2008 in GB 0808957.5.

UK Intellectual Property Office Examination Report dated Sep. 24, 2008 in corresponding UK Application 0808957.5.

UK Examination Report dated Jun. 14, 2010 in GB 0808957.5.

UK Notification of Grant dated Jul. 13, 2010 in GB 0808957.5.

* cited by examiner

SPEECH SCREENING

This application claims priority to Great Britain Application No. 0709574.8, filed 18 May 2007, and claims benefit to U.S. Provisional Application No. 60/924,564, filed 21 May 2007, the entire contents of each of which are hereby incorporated by reference.

This invention relates to the field of screening speech, especially to screening speech transmitted via the internet or mobile communication devices, so as to allow detection of unwanted words or phrases such as profane, obscene or inappropriate language for the purposes of access control and/or threat spotting.

The growth of the internet has allowed users to communicate with other users in a variety of different ways, e.g. email, messaging, chat-rooms and discussion boards, and also allowed access to a wealth of textual, visual and multimedia content much of which can be added by anyone. Parents often allow their children to access the internet but wish to monitor or police their children's usage so as to prevent access to unsuitable sites or access to unsuitable discussion forums. Most web-browsing software therefore has some content control functionality which allows a parent to set access conditions. Parental access control software is also available which can be set up to monitor a child's internet access and to block access to unsuitable content. Such software can also monitor a child's communication with others via email, instant messaging, posting to a message board etc. for instance to prevent a child from divulging personal information or blocking inappropriate messages. Such software can also provide a report to a parent on the type of communication their child is engaging in.

The software filters out inappropriate content based on defined words, e.g. profane or obscene language, being present in the internet content or the metadata relating thereto. Communications will be monitored for defined words or phrases.

Increasingly however users of the internet are uploading multimedia files such as video clips etc. on their own websites. Such content may have little or no textual content or description and therefore it is difficult for conventional parental control software to police such content.

Further the growth of voice over IP (VoIP) allows users of the internet to talk to each other via the internet. The user speaks into a microphone connected to their computer system and the resulting digitised audio data is sent as packets of data via the internet. The information is therefore transmitted as audio data and contains no textual information for the parental control software to analyse.

Mobile communications devices are also increasingly being used to connect to the internet and allow users to access a variety of internet based content. Multimedia content or software applications can also be sent to a user's mobile communication device on demand. Further, such mobile communication devices increasingly have the ability to capture sound and vision and allow users to share their audio and/or video.

The present inventors have therefore realised that there is a desire to provide a screening capability for access control to internet content or the like which is not based on textual information and also for a capability to screen voice based communications, especially voice based communication over the internet.

Thus according to a first aspect of the present invention there is provided a method of providing access control for a user device comprising a speech recogniser arranged to process audio data a user attempts to access to detect any of a set of pre-defined threat words or phrases and, on detection of one or more said threat words or phrases, initiate a threat detection response.

The user device may be anything which is capable of providing a user with access to audio data, for instance a personal computer, palmtop, mobile telephone, music or dvd player etc. It could also be a television connected to an on-demand television or video service or a telephone or converged device offering telephone capability.

The audio data may be any audio data whether or not stored with visual or textual data in a multimedia content. For instance the audio data could be part of an audio-video data file or could be solely audio data.

The audio data may be stored locally on a memory in the user device or the user device may be adapted to access audio data stored remotely. For instance where the user device is a personal computer connected to the internet there may be some audio data stored on the local hard drive of the personal computer and the access control method would allow access control to such locally stored content as well as remote content accessed via the internet.

The threat words or phrases may for instance be profane or obscene language, blasphemous language, language indicating violence or unacceptable attitudes. The set of threat words is preferably updatable to take account of new trends and an administrator of the access control system, e.g. a parent, may be able to add their own threat words and phrases. The threat words or phrases may also include grooming words or phrases which predators use to meet children or solicit personal information.

There may be one or more sets of threat words or phrases. The threat words or phrases may be categorised. For instance obscene language could be categorised with a measure of severity, with words deemed to cause the most offence or being the most unsuitable for children or vulnerable adults being categorised the most severely. Equally words or phrases indicating violent or other unacceptable attitudes could be categorised together. The threat detection response may depend on the category of threat word detected.

The threat detection response could take a number of different forms. Access to the audio data as a whole could be blocked. The attempt to access the audio file could be logged or communicated to an administrator of the system, i.e. the system could log suspicious files for a parent to view later to decide whether or not they are acceptable.

When the threat words or phrases are categorised the threat response may vary depending on the category of the word or phrase. The number of detected threat words may also have a bearing on the threat response. For instance detection of a single instance of a low severity threat word in some audio data may result in the audio being played with the offending word removed whereas several instances of threat words being detected results in a block in access.

The method of the present invention therefore allows a tailored response and is more than a simple censorship system.

The method according to the present invention may allow an administrator to set various access levels for different users. For instance a parent may with children of varying ages may wish to prevent a younger child from exposure to any audio data comprising a threat word or phrase but may allow an older child a greater degree of access and responsibility. The access control system may therefore look for different numbers of threat words and phrases depending on a user access level and/or may make different threat responses depending on a user access level. Thus a young child using the system may have a very restricted access with several sets of threat word lists being used and the threat detection response being automatic blocking of any audio data containing threat words. An older child may be allowed wider access rights. In this case the system may not include certain sets of relatively minor threat words in the search. At a relatively high access level the system may only look for a limited set of threat words and/or the threat response may be to provide a warning to the user that the audio file contains threat words allowing the user to continue with access if required. Such continued access after a warning could be logged and the audio data or a link thereto stored. This may allow much older children to effectively self certify the audio content they access but allow a parent to monitor the access.

The method of the present invention may be implemented in software. Thus the present invention also relates to a programme for a computer adapted to perform the method described above. The software could be run on a personal computers or mobile computing device or could be downloaded to a mobile telephone, music or dvd player or television decoder. The software could also be hosted remotely. For instance a user having a personal computer connected to the internet will generally access the internet through an internet service provider (ISP). The ISP may host the speech recognition software and list of threat words and phrases and will perform the screening on audio data the user attempts to access.

As the amount of non-indexed audio grows on the internet search engines may allow for searching of audio data. The search engine could also implement the method of the present invention and, when searching for the specified search term also search for any threat words or phrases. If threat words or phrases are detected in the audio data the user could informed or the threat words and phrases, or category of threat word or phrase, could be added as textual metadata to the file allowing a user's text based parental access control system to operate.

When a user attempts to access some audio data the method may involve the step of processing the whole of the audio to detect any threat words or phrases prior playing the audio to the user. In effect once a user tries to download or play some audio the relevant audio data is screened prior to the user hearing anything. This allows the threat detection response to be a block on access. Alternatively a certain part of the audio data could be checked and, if acceptable, played to the user whilst the next segment of the audio data is checked. Thus longer audio files can be segmented and each segment checked. Given that speech recognition technology is capable of operating in real time the processing of the audio data may be carried out in real time but with a delay applied to the audio prior to playing to allow for threat words to be removed or the audio stopped prior to an occurrence of a threat word.

The method of the present invention may also involve the step of screening for the existence of any threat words or phrases in any textual data a user attempts to access and/or any metadata relating to data a user attempts to access. In other words the present invention may be used in combination with, or incorporated into, existing parental control type systems that check textual information.

The present invention also therefore relates to an access control apparatus for a user device capable of accessing audio data comprising a speech recogniser adapted to process any audio data a user attempts to access so as to detect the presence of any pre-defined threat words or phrases and activate a threat detection response on detection of one or more said threat words. All of the advantages and embodiments described above with respect to the method apply equally to the access control apparatus.

The first aspect of the present invention provides a way of providing screening for access of stored audio data. However as mentioned the growth of voice over IP allows users to talk to other users in real time via the internet. Some on-line games allow connected users to talk to other gamers. The growth of spoken communication via networking or gaming sites is anticipated. Again parents have a concern that their children are not exposed to inappropriate language. Furthermore the ability to communicate with strangers involves a risk of children or vulnerable adults coming into contact with predators who may try to win a child's trust and get the child to divulge personal information or possibly arrange a meeting. Such activity often involves certain types of so called grooming phrases which can be screened for in textual communication but not in real time or near real time speech. Therefore in another aspect of the invention there is provided a method of monitoring audio data transmitted over a computer network comprising arranging a speech recogniser to process said audio data to detect any of a set of pre-defined threat words or phrases and, on detection of one or more said threat words or phrases, initiate a threat detection response.

This aspect of the invention is similar to the first aspect of the invention with the difference that the audio data corresponds to speech transmitted by one of the users of the network. Thus the speech recogniser may be adapted to process any audio data transmitted to the user device, whether corresponding to stored audio data or real time speech, and also any audio data transmitted from the user device. The user device may be a personal computer or mobile computing device or game console or VOIP phone connected to network. Or it may be part of the network, either within a home or office such as a home router, or within the network infrastructure. Any of the embodiments of the method described above with reference to the first aspect of the invention may also be applied to this aspect of the invention. For instance an administrator may be able to set different levels of access for different users, there may be several sets of threat words and phrases and the threat words and phrases may be categorised.

The threat words may again include obscene or profane language. The threat words and phrases may particularly include grooming words or phrases.

The threat detection response may again depend on the particular words or phrases used. As the method is screening real time speech it is not possible to block access in advance. The threat detection response may be to remove the offending word or phrase from the audio played to the user, i.e. to mute the offending word or phrase in the audio stream, or it may terminate the connection. Detection of a threat word or phrase could result in the spoken audio containing the threat word or phrase being recorded. A specified person, e.g. a parent, could also be notified. The method of the present invention could also monitor the frequency and severity of the threat words or phrases and take appropriate action. For within a certain period of time utterance of occasional low severity threat words may result in no action being taken or maybe the threat words themselves could be muted. However regular occurrence of threat words or phrases could result in the whole voice connection being automatically terminated. The present invention therefore provides an access control system and has a more sophisticated response than simple censoring speech.

Where the threat word detected is a grooming word or phrase the detection of such a phrase could also be reported to a specified agency, such as a law enforcement agency and/or the security division of the relevant internet service provider for further investigation.

The method of the present invention is suitable for implementation in the home by a parent or carer. However the method may also be implemented by a network provider to ensure that use of the network is acceptable and to combat predators from using the network to prey on children or vulnerable adults.

The method is particularly applicable to Voice-over-IP (VoIP) audio communication but is applicable to any audio data communication over a computer network.

Again the method may be implemented in software and the present invention therefore also provides a program for a computer adapted to perform the method of monitoring audio data transmitted over a computer network.

In general the present invention resides in the use of speech recognition to monitor and regulate exposure of a user to offensive or inappropriate language transmitted over a network.

The speech recogniser used in any aspects of the invention may be any speech recogniser that can quickly process the audio data to detect the presence of any threat words or phrases. The speech recogniser could be arranged to effectively transcribe any spoken audio into text using a large vocabulary speech recogniser and then apply text based searching on the transcript.

In a preferred embodiment though the speech recogniser uses a phonetic approach processes the audio data against various audio models to determine the likelihood of a segment of spoken audio corresponding to a particular phoneme. The threat words and phrases are converted to phoneme sequences and the search looks to identify any likely matches to that phoneme sequence. Such a phonetic based approach is described in European patent publication EP1688915.

The invention will now be described by way of example only with reference to the following drawings of which;

Figure 1:
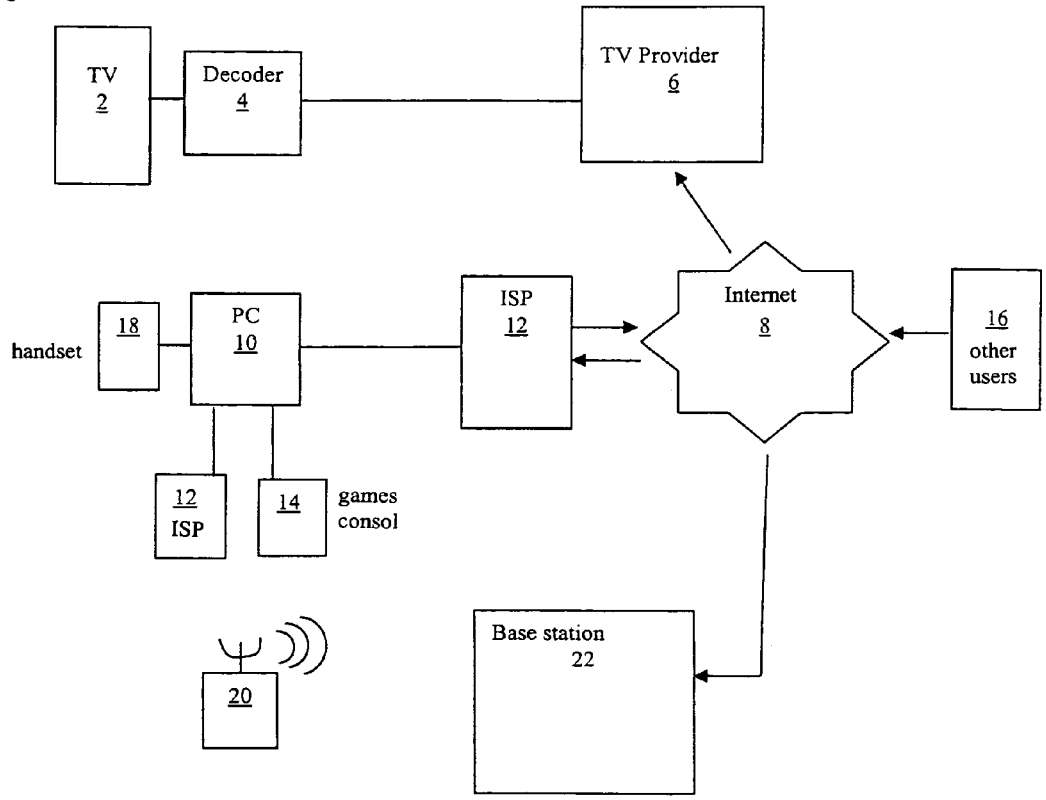
FIG. 1 shows illustrates a variety of ways a user might receive audio data.

The growth of the internet and other network based services are allowing users access to an increasing amount of stored material including a large amount of material having spoken content. Further on-line communication allows users to communicate freely by speaking. FIG. 1 illustrates just some of the ways in which a user may receive spoken data.

A television set 2 connected to a digital cable/satellite decoder 4 may allow a user access to TV on demand. The decoder 4 is connected to the TV content provider 6 which incorporates a video library 6 and a user may select items to view. The content provider will often provide guidance and/or ratings regarding the stored content and the software running the decoder may allow a parent or guardian to set access controls to ensure a child is prevented from accessing adult material. However the parent is reliant on the content provider having appropriately censored or rated the content. Further the cable or satellite link may also be used to provide content from the internet 8 to a user. Material accessible via the internet often has no such content rating or censorship.

The internet can obviously be accessed via a personal computer 10 via an internet service provider (ISP) 12. A user may access a very wide variety of stored material. Various peripheral devices such as an mp3 or other music player 12 may be connected to the computer 10 to store downloaded audio or multimedia files. A games console 14 may be connected to the computer to access the internet for on-line gaming. Some games allow users to speak directly to other users 16.

The personal computer could also be used with a headset or telephone type handset 18 to allow a user to talk to another user 16 with the audio data transmitted via the internet.

Mobile devices 20 such as a palmtop mobile computer or a mobile telephone can also connect to the internet via a base station 22 and allow a user to access stored content or speak with other users.

Given the ability of a user to choose what they access, the desire for parents and guardians or other carers responsible for children or vulnerable adults to ensure their charges do not get exposed to inappropriate material is high. Also the ability to communicate with strangers, and inherent anonymity of internet communications, brings with it the risk of predators which parents wish to guard against. Text based internet access and communication monitoring software is available and picks up a lot of inappropriate material based on the textual content or metadata associated with the content. However the increased use of audio/video data and ability for users to upload their own content to the internet results in material being available which presently can't be screened.

Figure 2:
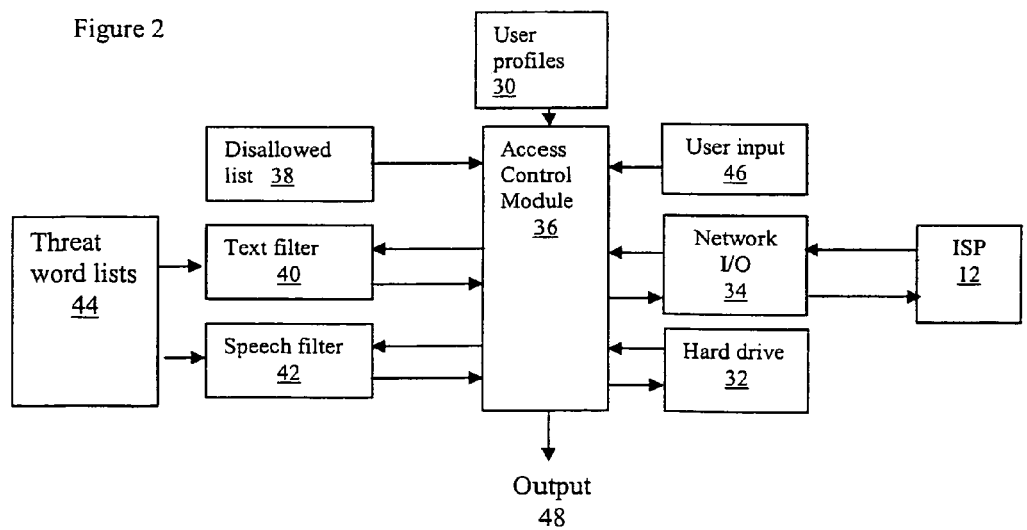
FIG. 2 illustrates the access control system and method of the present invention.

The operation of the present invention is therefore illustrated with respect to FIG. 2. A parent or carer implements an access control system, for instance by installing some access control software on their personal computer or by setting up some access controls with the internet service provider, tv content provider, mobile telephone network provider etc. The following description will be based on a personal computer connected to the internet but it will be appreciated it would apply to the other methods of accessing stored content described.

A user wishing to use the computer will first log in to identify that user. The user's login details are compared to a stored set of user profiles 30 to identify the user and their access level. The level of access and appropriate threat detection response for each user profile may be set by a parent acting as the administrator.

A user then may attempt to access some stored content. The content could be stored locally on the computers hard drive 32 or may be available on the internet 8. When accessing data via the internet the computer downloads the information via a network card 34 and accessed the internet via an ISP 12. Whichever method is used the data is passed to an access control module 36 which processes the data according to the access control settings for that particular user profile 30. Alternatively the data could be real time data sent by another internet user, for instance text based instance messaging or audio data transmitted as Voice over IP.

The user may also input data from a peripheral 46. In the case of text this could be simply typing via the keyboard but for VoIP the user could speak into a microphone or suitable VoIP telephone handset. The access control system also therefore monitors data communicated to the internet by a user.

The access control module has a disallowed content list 38 which will prevent access to predefined websites, such as sites known to be unsuitable, and unacceptable website types, e.g. chatrooms. It may also prevent voice communications being established with certain listed addresses, in effect the equivalent of barring certain predefined telephone numbers in a traditional telephonic network. The access control software may be integrated with computer security monitoring modules that check for viruses, spyware etc. but that aspect will not be discussed here.

The data is also passed to text filter 40 and speech filter 42 which look for instances of words and phrases stored in a threat word store 44.

The threat word store 44 contains at least one list of predefined threat words. The threat words and phrases may be categorised. For instance the words may be grouped according to a categorisation of how offensive they are generally perceived to be. Words indicative of violence may be categorised as such. Thus the administrator may be able to include certain groups of words in the search depending on the level of access granted to a user. For instance the user profile for a young child could be set to identify all threat words whereas the user profile set up for a teenager may not search for the threat words categorised as relatively minor.

The text filter 40 will apply known text searching techniques to the data to identify any relevant threat words or derivates thereof for that user.

The speech filter 42 will process any audio data in the data and search for instances of the threat words. The speech filter is a phonetic recogniser such as described in European patent application publication EP1688915, the content of which is hereby incorporated by reference thereto. It is provided with phonetic models which contain model details of a set of reference phones. The reference phones may be all the phones of a particular language or may be a set of phones from a plurality of languages. The phonetic recogniser analyses frames of the audio data, typically at a rate of 100 frames per second, and for each frame compares the audio data with the phonetic models. Typically, the models will be hidden Markov models (HMMs) and will contain features related to the spectral content of the sounds they are associated with. One or more HMMs will represent each phone and durational characteristics of the phone are also modelled. The same features are calculated for the audio to allow the recogniser to determine the models that match the audio data most closely. The phonetic recogniser calculates model distances using all of the model features that typically relate to the frequency content of the signal. In some instances phonetic grammar rules may also be used in determining the scores for each phone, i.e. rules relating to impossible or unlikely phone sequences.

Calculating model distances for phones in the audio data is known in the art of automatic speech recognition and the calculated distances, which effectively indicate how likely it is that a particular phone occurs at a given time in the audio, are generally used to decide on a particular word or sequence of words. For instance an open-source Java based speech recogniser, Sphinx-4, hosted by sourceforge.org, operates using a hidden Markov model (HMM) based acoustic model and determines scores for matches with particular words.

The initial output from the model may be modified to aid discrimination between phones later or other information may be used to set the final score. The initial processing therefore produces an index file which effectively represents the audio as a series of discrete time segments, also known as frames and, for each frame, stores the probability of that audio segment being each one of the reference phones. This index file can then be searched for phone sequences corresponding to the threat words and phrases.

The phone sequences corresponds to the threat words and phrases and also to derivations of the words or phrases and different pronunciations thereof. These phone sequences can be stored along with the threat word or phrase to avoid producing them each time. However the threat word list could be arranged to include user defined terms added by the administrator and, in such case, at least the first time the words are added or searched for a phone sequence will be generated by a letter to sound pronunciation generator which will generate the phone sequences to be searched for from a text based input.

When the user is attempting to access stored content the whole of the audio data may be processed to generate a searchable phone sequence data set. Alternatively the audio may be processed in small segments. When the audio corresponds to real time speech the data is processed in real time to detect any threat words or phrases.

To search the index file created in the initial processing a dynamic programming (DP) search is performed on the data to identify likely occurrences of each phonetic search sequence based on the model distances stored in the phonetic index files. Dynamic programming is a well established technique used in a variety of pattern matching applications. It provides a computationally efficient way to align two sequences of arbitrary length in a way that applies the optimum non-linear timescale distortion to achieve the best match at all points.

The DP search will identify the most likely matches to the threat word or phrase phone sequence and also give a confidence score. Applying a threshold to the confidence score the speech filter therefore determines whether a threat word or phrase is present or not.

If a threat word or phrase is detected the access control module may take a number of different response depending on the user profile and threat word detected. The number of threat words detected may also be used in determining the response. For a user with limited access settings, or for detection of the most severe threat words or phrases the access control module may deny access to the particular file or terminate connection to a particular site or other user. For some threat words the access controller may effectively substitute that portion of the audio which corresponds to the threat word or phrase with audio data which corresponds to silence in any data that is saved on hard drive 32 or sent to an audio output 48. The audio output 48 could be an internal or external audio player module or could be an external device such as an mp3 player or similar.

The access controller may also store a copy of the audio data, or link thereto, for a parent to investigate later. The access control may also send an email or otherwise communicate with the administrator of the system alerting them to the fact.

Where the detected threat phrase is a grooming phrase or attempt to get a child to reveal personal information a communication might also be sent to the ISP or a law enforcement agency alerting them to the fact.

The invention claimed is:

1. A method of providing access control for a user device comprising:
   processing input audio data using an access control module having a speech recogniser to produce index data representative of the likelihood of matches of portions of the input audio data to a set of predefined phones;
   searching the index data for a match to any one of a set of phone sequences corresponding to predefined threat words or phrases in order to detect any of the set of pre-defined threat words or phrases within the audio data; and
   initiating a threat detection response by the access control module on detection of one or more said threat words or phrases, by varying the ability of a user to access the audio data via the user device, wherein the set of pre-defined threat words or phrases are categorised into one or more categories according to a level of perceived offensiveness for the threat words or phrases, wherein a level of threat is determined for the threat words or phrases detected in the input audio data based on the category in which the threat word or phrase is categorised, wherein the threat detection response by the access control module, and therefore the ability of the user to access the audio data via the user device, is based on the determined level of threat, said method steps implemented on a data processor.

2. A method as claimed in claim 1 wherein the audio data is part of an audio-video data file.

3. A method as claimed in claim 1 wherein the audio data may be stored locally on a memory in the user device.

4. A method as claimed in claim 1 wherein the user device is adapted to access audio data stored remotely.

5. A method as claimed in claim 1 wherein the set of pre-defined threat words or phrases comprise at least one of profane or obscene language, blasphemous language or language indicating violence or unacceptable attitudes.

6. A method as claimed in claim 1 wherein the threat detection response includes the step of communicating the attempt to access the audio data to a system administrator or parent/guardian.

7. A method as claimed in claim 1 wherein the threat detection response comprises at least one of blocking access to audio data, removing or masking the threat word or phrase from the audio output from the device, or logging the attempt to access the audio data.

8. A method as claimed in claim 1 wherein the perceived level of offensiveness of the threat words or phrases detected is dependent on used characteristics such as age.

9. A method as claimed in claim 1 wherein the threat response depends on the number of detected threat words in the audio data.

10. A method as claimed in claim 1 wherein the threat detection response varies according to a user access level.

11. A method as claimed in claim 1 wherein the threat detection response is set by a system administrator.

12. A method as claimed in claim 1 further including the step of processing the whole of the audio to detect any threat words or phrases prior to playing the audio to the user.

13. A method as claimed in claim 1 wherein segments of the audio data are processed by the speech recogniser and, if acceptable, played to the user whilst the next segment of the audio data is processed.

14. A method as claimed in claim 1 wherein the processing of the audio data is carried out in real time but with a delay applied to the audio prior to playing to allow for threat words to be removed or the audio stopped prior to an occurrence of a threat word.

15. A method as claimed in claim 1 further comprising the step of screening for the existence of any threat words or phrases in at least any one of textual data a user attempts to access and any metadata relating to data a user attempts to access.

16. A method as claimed in claim 1 wherein the speech recogniser processes the audio data against various audio models to determine the likelihood of a segment of spoken audio corresponding to a particular phoneme.

17. A method as claimed in claim 16 wherein the threat words and phrases are converted to phoneme sequences and the search looks to identify any likely matches to that phoneme sequence.

18. An access control apparatus for a user device capable of accessing audio data, said apparatus comprising:
  a speech recogniser configured to process any audio data a user attempts to access so as to detect the presence of any pre-defined threat words or phrases and activate a threat detection response on detection of one or more said threat words the apparatus comprising:
  an access control module configured to process said audio data using a speech recogniser to produce index data representative of the likelihood of matches of portions of the audio data to a set of predefined phones and wherein a user accesses the audio data via the access control module;
  the access control module further configured to process said index data to detect any of a set of pre-defined threat words or phrases and, on detection of one or more said threat words or phrases, to initiate a threat detection response by the access control module varying the ability of a user to access the audio data via the user device wherein the set of pre-defined threat words or phrases are categorised into one or more categories according to a level of perceived offensiveness for the threat words or phrases, wherein a level of threat is determined for the threat words based on the category in which the threat word or phrase is categorised according to the user and wherein the threat detection response is based on the determined level of threat.

19. A method of monitoring audio data transmitted over a computer network, said method comprising the steps of:
  processing input audio data using an access control module having a speech recogniser to produce index data representative of the likelihood of matches of portions of the input audio data to a set of predefined phones, wherein a user accesses the audio data via the access control module;
  searching the index data for a match to any one of a set of phone sequences corresponding to predefined threat words or phrases in order to detect any of the set of pre-defined threat words or phrases within the audio data; and
  initiating a threat detection response by the access control module on detection of one or more said threat words or phrases, by varying the ability of a user to access the audio data via the user device, wherein the set of pre-defined threat words or phrases are categorised into one or more categories according to a level of perceived offensiveness for the threat words or phrases, wherein a level of threat is determined for the threat words or phrases detected in the input audio data based on the category in which the threat word or phrase is categorised according to the user, wherein the threat detection response is based on the determined level of threat and the ability of the user to access the audio data via the access control module is varied according to the threat detection response, said method steps implemented on a data processor.

20. A method as claimed in claim 19 wherein the speech recogniser is adapted to process any audio data transmitted to the user device and also any audio data transmitted from the user device.

21. A method as claimed in claim 19 wherein the set of pre-defined threat words or phrases comprise at least one of profane or obscene language, blasphemous language, language indicating violence or unacceptable attitudes or grooming words or phrases.

22. A method as claimed in claim 19 wherein said threat detection response includes the step of communicating the attempt to access the audio data to a system administrator or parent/guardian or specified agency.

23. A method as claimed in claim 19 wherein the threat detection response comprises at least one of terminating the connection, removing or masking the threat word or phrase from the audio output from the device, logging the attempt to access the audio data, or recording the spoken audio.

24. A method as claimed in claim 19 wherein the perceived level of offensiveness of the threat words or phrases is dependent upon the user characteristics such as age.

25. A method as claimed in claim 19 wherein the set or sets of pre-defined threat words which are checked for varies according to a user access level.

26. A method as claimed in claim 19 wherein the threat detection response is set by a system administrator.

27. A method as claimed in claim 19 wherein the communication is Voice-over-IP (VoIP) audio communication.

28. A program comprising a non-transitory computer readable storage medium storing a computer program which, when loaded on a computer, will cause the computer to perform the method of monitoring audio data transmitted over a computer network as claimed in claim 1.

* * * * *